May 17, 1966  M. V. WILLIAMSON  3,251,357
WATER TREATMENT AND APPARATUS
Filed Oct. 13, 1964
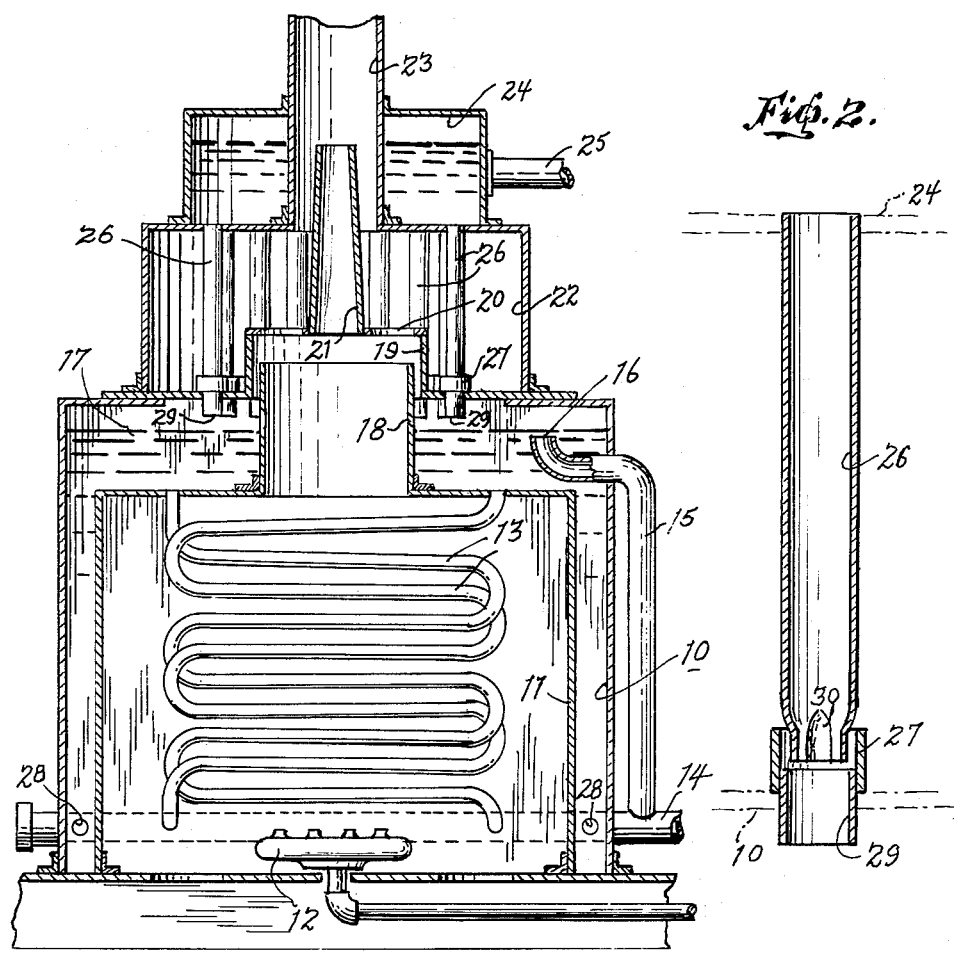
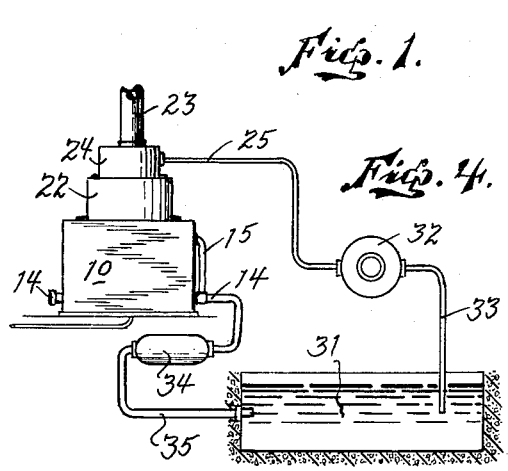
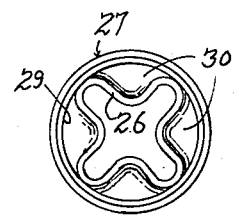
INVENTOR.
MILO V. WILLIAMSON.
BY
ATTORNEY 3,251,357
WATER TREATMENT AND APPARATUS
Milo V. Williamson, Brisbane, Calif.
(2079 Market St., San Francisco, Calif.)
Filed Oct. 13, 1964, Ser. No. 403,565
4 Claims. (Cl. 126—355)

My present invention relates to water treatment and more particularly to a system and apparatus for treating green water to inhibit growth of micro-organisms, algae and the accumulation of slime and has for its principal object the provision of a device by which algae and slime inhibiting gas may be introduced into a water circulating system connected to the pool of water to be treated.

Another object of the invention is to provide a simple device for introducing carbon monoxide gas resulting from the combustion of fuel into a circulating water system.

A further object of the invention is to provide a system and apparatus for heating and treating the water of a swimming pool to inhibit growth of contaminating micro-organisms in which the carbon monoxide gas given off by a gas burner employed in the conventional manner as a means for heating the swimming pool water is the sole inhibiting agent.

Other objects and advantages of the invention will be in part evident to those skilled in the art and in part pointed out hereinafter in connection with the accompanying drawing wherein there is shown by way of illustration and not of limitation a preferred embodiment of the invention.

In the drawing:

FIGURE 1 is a vertical sectional view taken in a vertical plane centrally of my water treating apparatus, FIGURE 2 is a view showing in detail a gas inducting tube as used in the apparatus of FIGURE 1, FIGURE 3 is a larger view looking upwardly at the inducting tube shown in FIGURE 2, and FIGURE 4 is a diagrammatic view showing the manner in which the apparatus shown in FIGURE 1 may be connected to a static pool of water undergoing treatment.

For the purpose of illustrating the invention there is shown in the drawing, an arrangement that will be found particularly adapted to the problem of heating and treating the water of a swimming pool or the like where in addition to the heating of the water my device will introduce carbon monoxide gas resulting from the burning of water heating fuel. While the apparatus shown will be found particularly well suitable for the heating and treating of swimming pool water it will be understood that the water treatment aspect of this disclosure may find other applications where it is desired to only inhibit the growth of micro-organisms, algae and/or slime.

In the drawing the numeral 10, designates a water tank which is here shown as square in outline and within this tank there is a fire box 11 that is somewhat smaller but of substantially the same general outline. The fire box 11 is heated by a gas burner or other open flame heating means 12. Within the fire box 11 and exposed to the flame produced by the burner 12 I show two heating coils 13 through which water will flow downwardly from the interior of the water tank 10 to an externally supported manifold 14 that has a stand pipe 15 with outlet 16 at its upper end that is adapted and arranged to maintain a predetermined level of water, designated by the numeral 17, within the water tank 10. Extending upwardly from the fire box 11 there is a stack 18 that is open at its upper end and surrounding the open end of this stack 18 there is a collar 19 which supports an open spider 20 upon which there is mounted a draft tube 21 that extends upwardly in axial alignment with the stack 18. This tube 21 is tapered and is provided to insure against a back draft in the flow of gases from the fire box 11 when the device is in operation. Surrounding the collar 19 there is a cylindrical gas accumulating chamber 22 that is in communication with the stack 18 and leading upwardly from this gas accumulating chamber 22 there is a chimney pipe 23 which serves to conduct any excess gases of combustion from the chamber 22. Next mounted directly above the gas accumulating chamber 22 there is a fresh water supply tank 24 into which water to be treated is introduced through a conduit 25.

As water is introduced through the conduit 25 it will flow downwardly from the tank 24 through a plurality of water tubes 26 and be discharged into the water tank 10 at a point above the level of the water 17 as determined by the outlet 16 of stand pipe 15. A feature of the water tubes 26 is that at their lower ends these tubes are provided with an atomized nozzle means 27 by which gas from the gas accumulating chamber 22 will be atomized and absorbed by the water as it flows to the water tank 10.

With the above described arrangement it will be seen that as the untreated water is introduced through the conduit 25 it will pass downwardly through the water tubes 26 with the gas atomized from the chamber 22 and be discharged into the water tank 10 from which the treated water will be withdrawn through the manifold pipe 14. In this latter connection it will be noted that the water passing through the heater coils 13 will be discharged into the manifold pipe 14 while additional water will flow to the manifold pipe 14 from the bottom of the tank 10 through ports 28 that are here shown as leading to the manifold pipe 14 at each side of the fire box 11.

In FIGURE 2 of the drawing there is shown a form in which the water tubes 26 may be constructed from ordinary copper or stainless steel tubing. The tubes 26 are here shown formed with a lower part 26, as previously designated, and a lower part designated by the numeral 29 and these two parts are secured together by the nozzle forming collar or means 27. In this assembly the lower end of the upper portion of the tubes 26 are crimped inwardly at four points, as is more clearly shown at the point 30 in FIGURE 3 of the drawing. In this arrangement the outer portions of the crimped ends of the tubes 26 will contact with the nozzle forming means 27 so that they may be brazed or welded together as a unit. When in operation the main stream of water going through the tubes 26 will be projected at the crimped ends thereof and as the flow of water enters the lower portion 29 of the tubes 26 gas will be sucked in and atomized and flow together with the cold water as it enters the water heating tank 10.

In FIGURE 4 there is shown an arrangement wherein the water treating device as described is installed for operation with a swimming pool 31. In this showing a pump 32 is connected to the pool 31 by an intake conduit 33 and the other side of the pump is connected to the conduit 25 previously described as leading to the untreated water supply tank 24. A filter 34 is also shown as connected in a line leading from the manifold 14 to a pipe 35 and back to the pool 31.

While I have for the sake of clearness and in order to disclose the invention so that the same can be readily understood, described and illustrated a specific device and arrangement, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a device for treating water to prevent the growth of micro-organisms, algae and slime, which comprises a combustion chamber having a stack for the escape of combustion gases, a water heating tank surrounding said combustion chamber into which treated water may accumulate, a combustion gas accumulating chamber in communicating relation with the stack of said combustion chamber, a fresh water supply tank, water tubes extending from said fresh water supply tank through said gas accumulating chamber and discharging water into the water tank surrounding said combustion chamber above the level of water therein, characterized by the fact that said water tubes have a gas atomizing means at their discharge ends whereby gas in said gas accumulating chamber will be inducted into the water as it flows from said fresh water tank through said water tubes and to the water heating tank surrounding the combustion chamber, and means for circulating water to be treated from a storage tank to said fresh water supply tank and back to said storage tank after treatment.

2. In a device for treating water to prevent the growth of micro-organisms, algae and slime, comprising a combustion chamber having a stack for the escape of combustion gases, a water heating tank surrounding said combustion chamber into which treated water may be heated, a combustion gas accumulating chamber in communicating relation with the stack of said combustion chamber, a fresh water supply tank, water tubes extending through said gas accumulating chamber from said fresh water supply tank and discharging water into the water tank surrounding said combustion chamber above the level of water therein, characterized by the fact that said water tubes have a gas atomizing port at their discharge ends whereby gas in said gas accumulating chamber will be inducted into the water as it flows through said water tubes and to the water heating tank surrounding the combustion chamber, and a pump with connections for recirculating water from a storage tank to said fresh water supply tank and back to said storage tank after treatment.

3. In water treatment apparatus for heating and inhibiting the growth of micro-organisms, algae and slime in the treated water, the combination of a water heating tank, fire box located within said tank having a flame supporting gas burner at its bottom and a stack leading upwardly therefrom and through said tank, a water circulating heating coil in said fire box over which the flames of said gas burner pass, said water circulating coil being connected at its upper end with the interior of said water heating tank and its lower end to an external manifold with heated water discharge pipe, the stack of said fire box being extended above the level of water within said water heating tank, a gas accumulating chamber mounted above said water heating tank, an untreated water supply tank from which water to be treated is supplied, a chimney extending upwardly from said gas accumulating chamber located centrally of the stack of said fire box an overflow conduit for maintaining a predetermined level of water within said water heating tank, and a plurality of water tubes extending downwardly through said gas accumulating chamber from said untreated water supply tank and terminating in said water heating tank above the level of water therein, said water tubes having a gas inducing configuration for injecting gas from within said gas accumulating chamber into the untreated water as it flows through said tubes to said water heating tank.

4. In water treatment apparatus for heating and inhibiting the growth of micro-organisms, algae and slime, the combination of a water heating tank, fire box located within said tank having a stack leading upwardly therefrom and through said water heating tank, the stack of said fire box being extended above the level of water within said water heating tank, a gas accumulating chamber in communication with said stack mounted above said water heating tank, an untreated water supply tank from which water to be treated is supplied, a chimney extending upwardly from said gas accumulating chamber located centrally of the stack of said fire box, an overflow conduit for maintaining a predetermined level of water within said water heating tank, and a plurality of water tubes extending downwardly through said gas accumulating chamber from said untreated water supply tank terminating into said water heating tank above the level of water therein having a gas inducting configuration at their ends for inducting gas from within said gas accumulating chamber to the water passing therethrough as it flows into said water heating tank.

References Cited by the Examiner

UNITED STATES PATENTS

| | | | |
|---|---|---|---|
| 1,484,857 | 2/1924 | Alexander et al. | 126—355 X |
| 1,527,740 | 2/1925 | Lipshitz | 126—359 |
| 1,560,806 | 11/1925 | Schucker | 126—359 |
| 2,619,955 | 12/1952 | Cartter | 126—355 |

FREDERICK L. MATTESON, JR., *Primary Examiner.*

ROBERT A. DUA, *Assistant Examiner.*